United States Patent [19]

Wisner

[11] 4,070,122
[45] Jan. 24, 1978

[54] BALL AND SOCKET JOINT AND METHOD OF MAKING

[75] Inventor: Ronald R. Wisner, Adrian, Mich.

[73] Assignee: Tecumseh Products Company, Tecumseh, Mich.

[21] Appl. No.: 723,013

[22] Filed: Sept. 13, 1976

[51] Int. Cl.² ............................................. F16C 11/06
[52] U.S. Cl. ...................................... 403/39; 403/122; 92/187; 92/157; 29/156.5 R
[58] Field of Search .................. 403/131, 122, 123, 76, 403/128, 39; 92/187, 186, 208, 157; 29/149.5 B, 441, 156.5 A, 156.5 R

[56] References Cited

U.S. PATENT DOCUMENTS

| 1,551,324 | 8/1925 | Offerdahl | 403/135 X |
| 2,000,172 | 5/1935 | Hanson | 403/131 X |
| 2,365,067 | 12/1944 | Gauld | 29/441 X |
| 2,964,365 | 12/1960 | Hausch | 403/122 |
| 3,163,094 | 12/1964 | Riedhammer et al. | 92/208 |
| 3,173,344 | 3/1965 | Mongitore | 403/122 X |
| 3,191,264 | 6/1965 | Underwood et al. | 403/140 X |
| 3,263,311 | 8/1966 | Riedhammer et al. | 29/149.5 B |
| 3,269,758 | 8/1966 | Ulderup et al. | 403/131 X |
| 3,482,487 | 12/1969 | Leffers | 403/140 X |

FOREIGN PATENT DOCUMENTS

| 535,813 | 1/1957 | Canada | 403/131 |

*Primary Examiner*—Andrew V. Kundrat
*Attorney, Agent, or Firm*—Albert L. Jeffers; Roger M. Rickert; John F. Hoffman

[57] ABSTRACT

A ball and socket joint and method of making in which a piston, especially a compressor piston, and most particularly a piston for a compressor that pumps refrigerant, has a top wall and a depending skirt and is connected to the upper end of a connecting rod by a ball joint which is made by forming a spherical socket in the upper end of the connecting rod and riveting a ball to the underside of the top wall of the piston and forming the upper peripheral region of the socket of the connecting rod around the upwardly facing side of the ball. In practice, the ball is placed in the socket of the connecting rod and the rod is formed about the ball and then the ball is riveted to the piston.

7 Claims, 2 Drawing Figures

BALL AND SOCKET JOINT AND METHOD OF MAKING

BACKGROUND OF INVENTION

The present invention relates to ball and socket connections for connecting pistons to connecting rods and is particularly concerned with such a connection in respect of compressor pistons for compressors, particular, refrigerant compressors.

Ball and socket joints for connecting pistons to connecting rods are known and examples thereof are to be found, for example, in U.S. Pat. Nos. 3,163,094, 3,191,264, 3,269,758 and 3,482,487.

Each of the ball joint connections illustrated in the foregoing patents exhibits weaknesses or defects in one way or the other, especially for use in connection with compressor pistons of the nature referred to. Among the defects to be found are assembly difficulties, expense of construction and lack of lubrication of the wearing parts.

A primary object of the present invention is the provision of a ball and socket joint of the nature referred to which eliminates the defects referred to above and which is at one time inexpensive, effective and simple to assemble.

BRIEF SUMMARY OF THE INVENTION

According to the present invention, a piston, especially a compressor piston, is provided with a top wall and a skirt portion depending from the periphery of the top wall. The top wall is thickened in the center and has an axial central hole formed therein. A connecting rod is provided for connection to the piston and has a spherical socket in the piston end adapted for receiving a ball which may be either steel or suitable plastic material with an upper edge of the socket adapted for being swaged or otherwise formed inwardly over the upwardly facing side of the ball thereby to hold the ball captive in the upper end of the piston rod while permitting swivelling of the ball in the sockets.

Preparatory to placing the ball in the socket, the ball is prepared so as to have a diametral hole therethrough, and in this hole is placed a rivet with a head that forms a continuation of the contour of the piston and which is disposed at the bottom of the socket when the ball is introduced therein.

After the ball is thus connected with the connecting rod, the rivet, which protrudes from the upper side of the ball, is passed through the central hole in the top wall of the piston and is expanded so as to hold the ball and rivet captive on the piston. The connecting rod has an axial passage therein through which lubricant can be supplied to the ball and socket joint.

The exact nature of the present invention will become more clearly apparent upon reference to the following detailed specification taken in connection with the accompanying drawing.

DETAILED DESCRIPTION OF THE INVENTION

Figure 1:
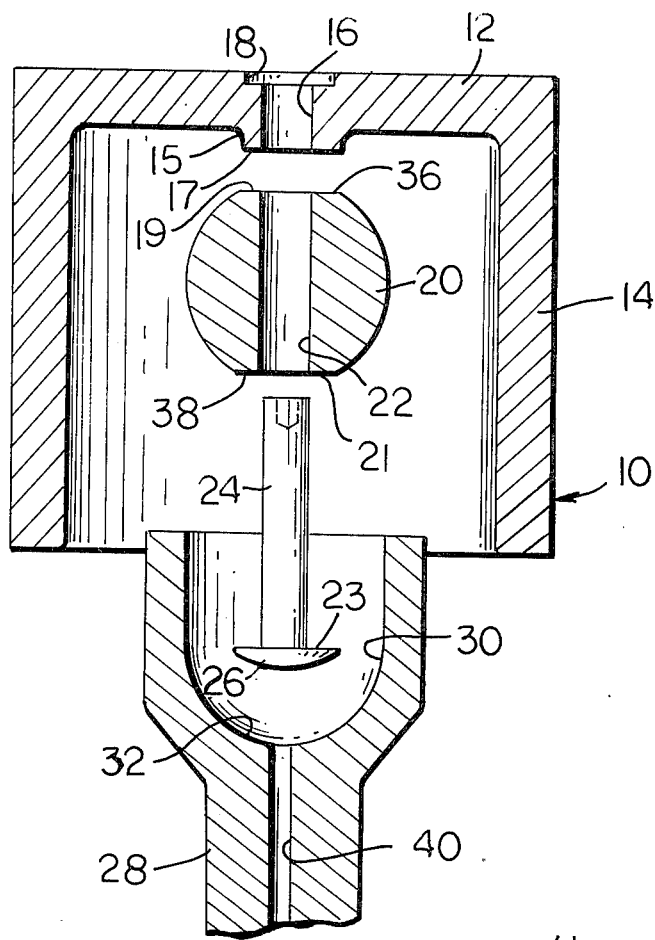
FIG. 1 is a sectional view of the present invention prior to assembly.

Referring to the drawing more in detail, 10 indicates a piston such as a compressor piston and, in particular, a piston for use in compressing refrigerant. Piston 10 has a transverse top wall 12 and a skirt 14 depending from the periphery of top wall 12. The center part thereof is thickened as at 15 and has an axial hole 16 formed therethrough which includes a counterbore 18 at the upper end.

Beneath the top wall of piston 10 is a ball 20 of steel or plastic or any other suitable material which has an axial bore 22 formed therein. Axial bore 22 is adapted for receiving the shank of rivet 24 which, at the lower end, has a head 26 which is contoured so as to form a continuation of the contour of ball 20 when the rivet is disposed in bore 22.

The reference number 28 designates a connecting rod which may be formed of aluminum or the like and the upper end of which is provided with a socket 30 having an upwardly facing hemispherical bottom surface 32 the same diameter as ball 20.

Figure 2:
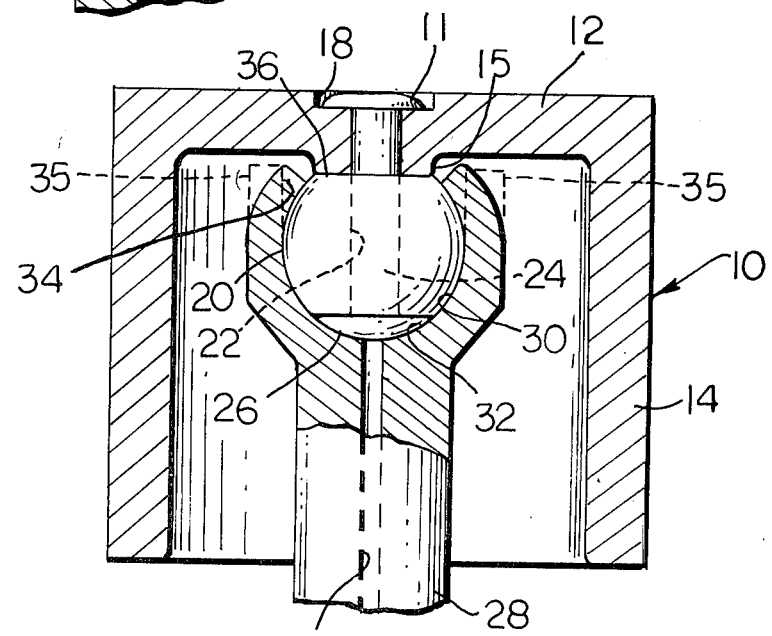
FIG. 2 is a sectional view of the present invention in its assembled state.

To assemble the ball and socket, the rivet 24 is inserted into the bore 22 of the ball 20 and thereafter placed in the socket 30. As shown in FIG. 2, the upper peripheral edge 34 illustrated in dashed lines at 35 is swaged or bent inwardly so as to hold the ball 20 captive on the upper end of the connecting rod while permitting free pivotal movement of the ball in the socket.

When the ball is thus mounted in the socket 30, and the socket has been swaged over as described, the connecting rod is placed in the piston with rivet 24 extending through bore 16 and up into counterbore 18. The upper end of the rivet can then be expanded as illustrated at 11 thereby locking the ball to the piston while, at the same time, reducing the volume of counterbore 18 to diminish the volume of the counterbore so as not to interfere with the efficiency of the compressing action by the piston.

The socket in which ball 20 is mounted is advantageously provided with lubricant via a passage 40 formed in rod 28. It will be noted that the upper end of passage 40, which opens into the socket, is isolated from the upper end of the piston and, thus, does not provide any path along which the gases being compressed can escape from the upper end of the piston.

The ball 20 is advantageously provided with an upper flat 36 and a lower flat 38, the upper flat providing for a bearing of the ball against the outside of the piston and the latter flat providing a surface for engagement with the upper side of the contoured head 26 of rivet 24.

Modifications may be made within the scope of the appended claims.

What is claimed is:

1. In a piston and rod assembly including a piston having a top wall and a skirt dependent therefrom and a connecting rod, a ball and socket joint for connecting said piston and connecting rod comprising: a generally spherical ball on the underneath side of said top wall of the piston, said ball having a truncated end providing a contiguous surface extension of a thickened portion on said top wall a hole in said ball and in said top wall, a rivet extending through said holes in said ball and piston top wall, said rivet having an enlarged head on one end in engagement with said ball and being expanded on its other end on the side of said piston top wall which faces away from said ball and into a counterbase aligned with said thickened portion, and a socket in one end of said connecting rod in which said ball is captured including means permitting universal swivelling movement of said ball therein.

2. The assembly of claim 1 wherein said socket is deformed inwardly around said ball.

3. The assembly of claim 1 wherein the expanded portion of said rivet is substantially flush with said piston and nearly completely occupies the volume of said counterbore.

4. The assembly according to claim 1 in which said ball has flats thereon at opposite ends of its said hole in planes perpendicular to the axis of its said hole to provide bearing surfaces at opposite ends of its said hole, and said rivet head has an underside engaging the flat adjacent thereto, said rivet head on the outer side being configured to form a continuation of the spherical contour of said ball.

5. The assembly according to claim 1 in which said ball has flats thereon at opposite ends of its said hole in planes perpendicular to the axis of its said hole to provide bearing surfaces at opposite ends of its said hole, and said rivet head has an underside engaging the flat adjacent thereto, said rivet head on the outer side being configured to form a continuation of the spherical contour of said ball, said first means comprising a portion of that part of said rod defining said socket formed over the side of the ball which faces the top wall of the piston.

6. The assembly according to claim 5 which includes a lubricant passage extending along said rod and opening into said socket.

7. The assembly according to claim 1 in which said socket comprises a cylindrical bore formed axially in said rod having the same diameter as said ball and having a rounded bottom on which the ball seats, and a region of said rod formed over the ball comprising at least a portion of the rod forming the wall of the cylindrical bore which is on the piston top wall side of the region where the rounded bottom of the bore merges with the cylindrical portion thereof.

* * * * *